Figure 1:
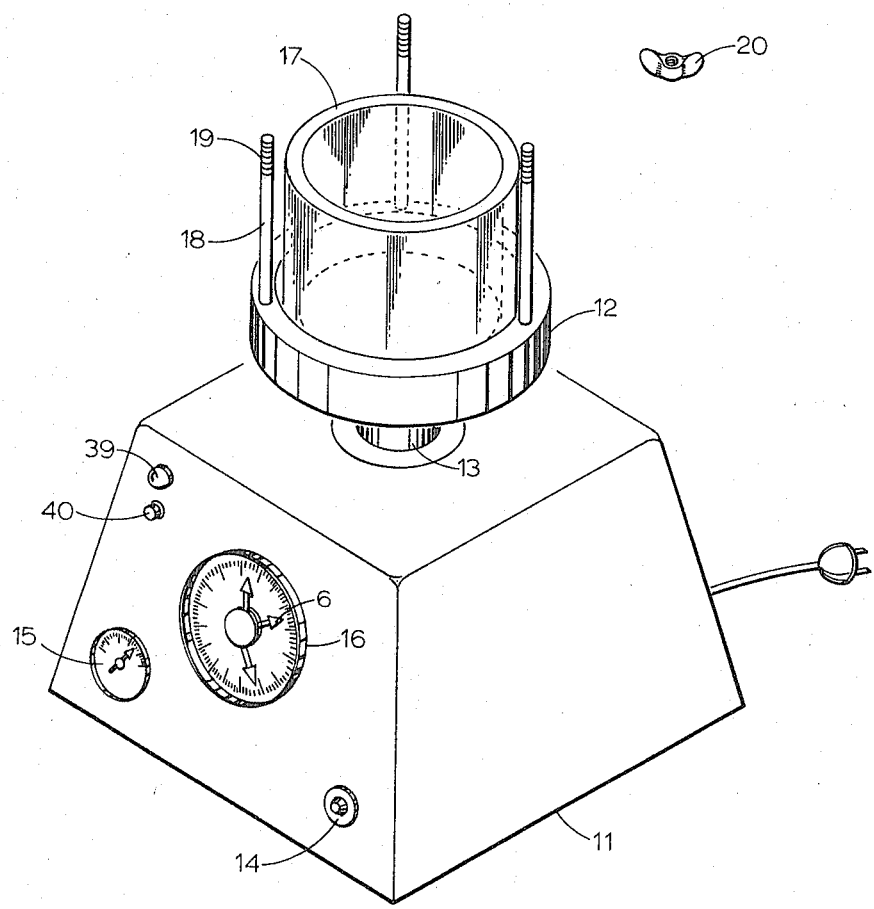

3,324,628
PREPARATIVE TREATMENT OF SAMPLES FOR SUBSEQUENT PROCESSING IN A GAS CHROMATOGRAPH
Samuel Natelson, Valley Stream, N.Y., assignor to Scientific Industries, Inc., Queens Village, N.Y.
Filed Sept. 8, 1964, Ser. No. 394,808
8 Claims. (Cl. 55—67)

The present invention relates to the preparative treatment of samples which will be subsequently processed in a gas chromatograph, and more particularly to the removal of unwanted components of the sample so that trace components which are to be analyzed can be passed into a gas chromatograph for separation and identification.

The hospital laboratory is often called upon to analyze body fluids for trace components. For example, the blood of a patient may comprise less than 0.1% of certain volatile constituents such as ethanol, methanol, acetone, and isopropanol. Blood or aqueous solutions cannot be resolved in the gas chromatograph unless the impurity, which in this case comprises 99.9% of the mixture is first removed. Another example is the carbon dioxide gas issuing from a $CO_2$ gas tank. This gas may contain traces of hydrocarbons, oxygen and nitrogen. In this case, it is advantageous to remove the carbon dioxide before subjecting the residual gases to gas chromatography. Still another example is the presence of trace amounts of denaturants in ethyl alcohol. The ethyl alcohol is advantageously removed before the trace substances are injected into the gas chromatograph for analysis.

In the past, the general procedure has generally been to separate the trace component by distillation and extraction procedures. These are complicated procedures and slow in operation, especially when large numbers of samples are to be assayed.

One of the problems in gas chromatography is the fact that the sample needs to be injected in a single slug. In this way, best resolution is obtained. Thus, the problem is not only to separate the unwanted components, but also to collect the sample to be injected so that it can be injected in the proper manner at the proper time.

Another problem is to retain the trace substances isolated and free of any added reagents so that one does not introduce extraneous material into the system.

Although many attempts may have been made to overcome the foregoing difficulties so as to prepare traces of samples which could be injected into a gas chromatograph apparatus, none, as far as I am aware have been entirely successful.

Therefore, an object of the present invention is to prepare a sample for subsequent processing in a gas chromatograph.

Another object of the present invention is to make it possible to conduct trace analysis with a gas chromatograph.

Still another object of the present invention is the preparative separation of traces of components in large quantities of a sample.

With the foregoing and other objects in view, the invention resides in the novel arrangement and combination of parts, in the details of construction and the process steps hereinafter described and claimed, it being understood that changes in the precise embodiment of the invention herein disclosed may be made within the scope of what is claimed without departing from the spirit of the invention.

Figure 2:
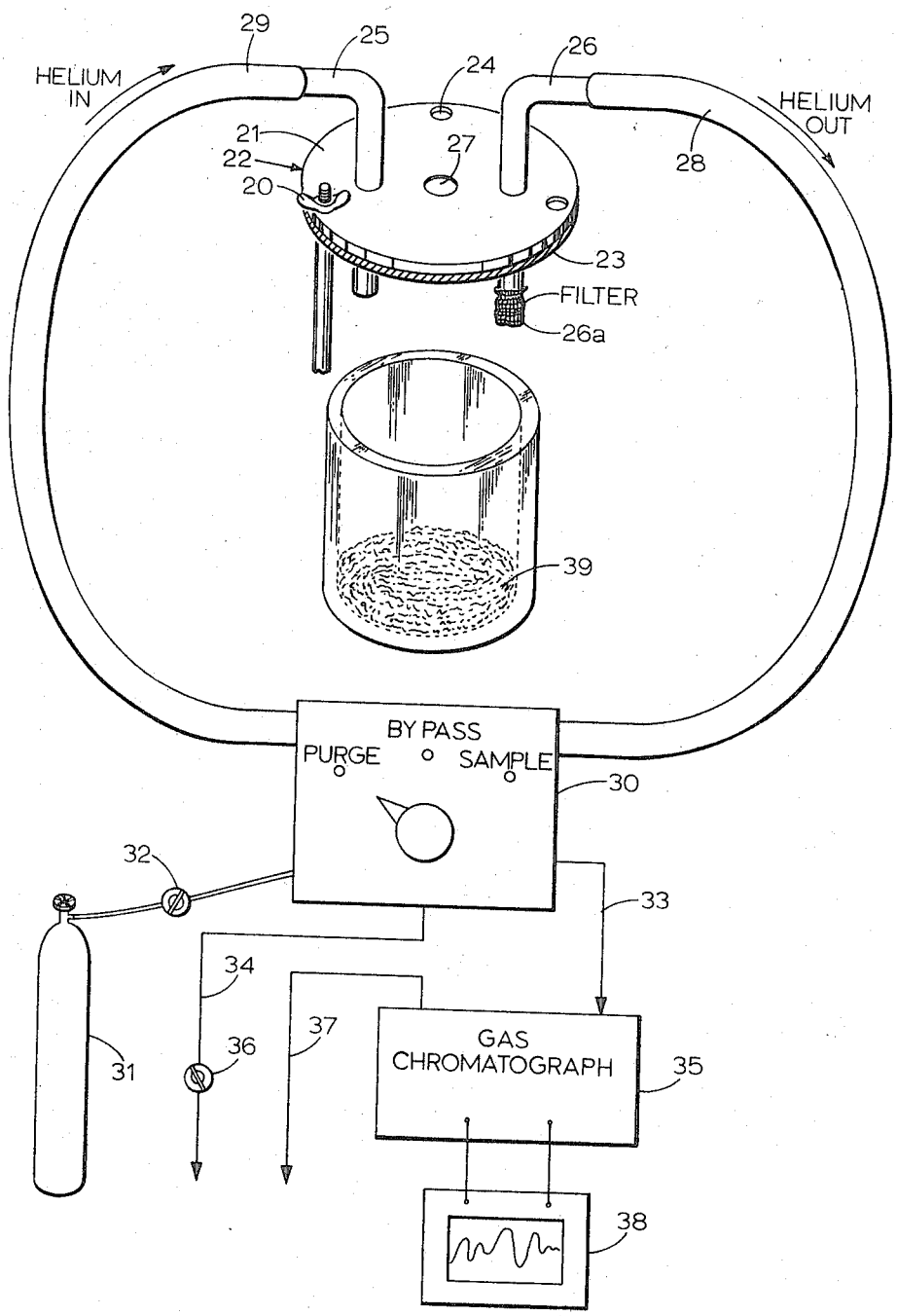

The accompanying drawings, illustrative of one embodiment of the invention, together with the description of the construction and methods of operation and utilization thereof will serve to clarify further objects of my invention. Other advantages will become apparent from the following description taken in conjunction with the accompanying drawing, in which:

FIGURE 1 is a perspective view of one portion of the apparatus contemplated herein; and, FIGURE 2 is a schematic diagram of another portion of the apparatus contemplated herein and a perspective view of some of the components shown in FIGURE 1 together with additional components.

In the instrument shown in the drawing, there is a base 11 containing a motor or other vibratory means to shake vigorously in a vibratory or swirling motion a support block 12 of metal. This block 12 has embedded in it (not shown) a heating coil and a themistor. Leads from this block go down through the block support 13 into the base. In this way, a constant temperature control dial 14 set in the base may be set so that the heating block will be at the desired temperature which is read on the temperature scale 15 also set in the base. In the base there is also a time and program setting means 16 which is rotated by hand to set three time indicating pointers at the time required for their action. The operation of the timer and program setting means 16 will be subsequently described herein. A removable cylindrical open-end container 17, preferably transparent is placed on block 12. Usually, this container will be of plastic or glass since metal containers often cause undesirable reactions. Protruding from the sides of block 12 are a plurality of support rods, preferably at least three. These support rods 18 are so disposed that the container 17 is between the rods. These support rods 18 have threaded ends 19 and can accommodate wing nuts 20.

Disposed over container 17 is a top plate 21 having an upper portion 22 made of metal or other solid material and supporting a gasket 23 made preferably of silicone rubber. The gasket and upper plate are preferably glued together. The plate contains a plurality of holes 24 corresponding to the support rods 18 so that the plate can be guided along the support rods over the top of the container and fastened to the container by the wing nuts. When the wing nuts are screwed down tight on the container, it is effectively closed against pressure because the gasket is squeezed onto the top of the container. Passing through the top plate and welded to the upper initial plate are inlet and outlet tubes 25 and 26 for entrance and exit of carrier gas of a gas chromatograph which will process the desired trace components of the sample. The upper plate also has a small sample aperture 27 drilled into the upper plate so that it does not penetrate the gasket. Into this aperture, a needle from a syringe may be inserted for the injection of a sample. If the gasket is made of rubber of the proper durometer, the hole made by the thin needle of the syringe is self-sealing.

At the inner end of outlet tube 26 is attached a small sack made of porous inert material 26a such as paper or cloth. This is to filter off any dust which may be blown into the gas chromatograph. In this way, a sealed chamber is formed from container 17 with two tubes 25 and 26 leading therefrom. These two tubes 25 and 26 are each connected by flexible hoses 28 and 29 to the gas chromatograph control valve 30. This valve is commercially available in several models. For the present invention it has three positions: purge, by-pass, and sample. The valve 30 is connected to a source of carrier gas 31 such as helium, nitrogen or argon. Source 31 is fitted with an outlet valve 32 to regulate the pressure into control valve 30. From control valve 30 there is a coupling hose 33 leading to the gas chromatograph 35 and a purge hose 34 leading to a purge exhaust valve 36 and then out to the atmosphere. An additional flexible hose 37 exits from the gas chromatograph. The peaks developed by means of the gas chromatograph are read out on a recorder 38 which is commercially available.

The apparatus operates as follows: the container 17 is charged with an absorbent solid 39. This solid is chosen for its absorbent qualities for the material to be removed, i.e., the undesired component constituting the bulk of the sample. If this material is water, the anhydride of a salt is used, e.g., sodium sulfate, sodium pyrophosphate, copper sulfate, cobalt sulfate or any anyhdride which forms a stable hydrate and is not reactive with the trace substance to be tested in the gas chromatograph. If alcohols are to be removed they may be removed with such substances as silica gel or calcium salts. If carbon dioxide, $H_2S$ or other acidic substances are to be removed, calcium hydroxide, calcium oxide, sodium or potassium hydroxide or mono, di or triethanolamine have proven to be effective. If ammonia or other basic volatile materials such as trimethyl amine are to be removed, then acid salts such as sodium acid sulfate or sodium dihydrogen phosphate have proven effective. Solid reagents are generally preferred because of their non-volatility and their high absorbent capacity.

The problem arises in mixing. If a magnetic stirrer is used, channeling occurs and the material is not properly mixed. For this reason, a vibrator or swirling type mixer is essential so that pooling of the sample does not occur at the upper part of the container. In carrying out trace analysis using the instrument, the instrument is assembled as shown in the drawing. The control valve is first turned to purge. The motor is started and the mixing action is carried out for a preset time to remove trapped air. The purge gas such as helium is then used to sweep the air out and through purge exhaust valve 36 which is opened. After a fixed time, the purge exhaust valve is closed and the control valve is turned to by-pass while the motor stops and thus the mixing action. At this time, the container is isolated from the system. During the purge step and by-pass step, the helium also continues to flow through the gas chromatograph. After any trapped air has been removed and the purge exhaust valve 36 is closed, a sample is injected with a syringe through sample aperture 27. The syringe is withdrawn and the shaker motor started. The undesired components then react quantitatively with the measured amount of absorbent forming a stable, non-volatile material but allowing the trace component to remain free. After a preset time when the reaction is complete, the control valve is turned to the sample position and the mixing is stopped. In this position, all the carrier gas sweeps through the container carrying with it the trace components into the gas chromatograph for a fixed time. The control valve is then turned back to by-pass and the container may be removed. A second container may now be installed and the process just described may then be repeated while the first sample readout is being produced on the recorder 38. During the entire process, the container is kept at constant temperature because of the heater in block 12.

The function of the three time and program setting means 26 can now be understood. One time set is for the mixing during purge. A second time set is for the mixing during by-pass. The third time set is for the injection time of the sample into the gas chromatograph. Thus, the operator sets three times, independently. When the push button 40 is pressed, the instrument will open the purge exhaust valve, purge and shake for a preset time and then turn by a spring loaded mechanism to by-pass, stopping the mixing action. At the set time, a light 41 goes on indicating that the sample should be injected into the container. The operator then injects the sample into the bottle with a syringe. By pressing push button 40 the cycle is continued, that is the mixing action takes place in the by-pass position for a fixed time and then automatically turns to the sample position for a fixed time, stopping the mixing action at the same time. The cycle is completed when the third time setting returns to zero causing the valve to be turned to by-pass. Of course, each step may be carried out manually.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A process for separating volatile trace components from a liquid sample consisting principally of undesired components and containing said volatile trace components, comprising the steps of:
   placing an absorbent material for physically absorbing the undesired components present in said liquid sample in a closed container having inlet and outlet tubes and a sealed aperture;
   sweeping an inert gas through the container by means of said tubes to remove the air therefrom, then closing said tubes to seal off the container;
   injecting said liquid sample into said container through said sealed aperture;
   shaking said container so as to bring said sample into contact with the absorbent material therein whereby said material absorbs the undesired components constituting the principal portion of said liquid sample, without affecting the highly volatile trace components;
   again sweeping the inert gas through the container to sweep the trace components into the outlet tube for further processing; and chromatographically separating said volatile trace components into the individual constituents thereof.

2. The process of claim 1, said process being carried out at a constant temperature.

3. The proces of claim 1, said steps being carried out and timed automatically.

4. An apparatus for removing a highly volatile trace component from a large quantity of a liquid sample consisting principally of undesired components prior to injection into a gas chromatograph, comprising in combination,
   a sample container containing absorbent material and having inlet and outlet tubes and a sealed aperture;
   vibrator mixing means disposed on the outside of said container, including container holding means, said vibrator mixing means shaking the container and its contents to cause a sample deposited in said container through said sealed aperture to react with other absorbent material previously deposited in said container so that said absorbent material adsorbs the undesired components constituting the principal portion of said liquid sample, without affecting the highly volatile trace components, and valve means to direct the flow of carrier gas to the atmosphere or to a gas chromatograph.

5. An apparatus as claimed in claim 4, said holding means including heating means to maintain material in said container at a constant temperature.

6. An apparatus as claimed in claim 5, including timing means in said mixing means so that the processing of the sample in the apparatus is done in a preset time.

7. An apparatus as claimed in claim 6, said timing means including at least three separate time setting means to sequentially set three preset time periods.

8. An apparatus as claimed in claim 6, said timing means being programmable so as to sequentially preset the time periods.

References Cited

UNITED STATES PATENTS

| 3,118,736 | 1/1964 | Taylor | 23—232 |
| 3,150,516 | 9/1964 | Linnenbom et al. | 55—197 |
| 3,184,222 | 5/1965 | Aronowitz et al. | 259—72 |

REUBEN FRIEDMAN, *Primary Examiner.*

C. N. HART, *Assistant Examiner.*